United States Patent
Wong

(10) Patent No.: US 6,380,320 B1
(45) Date of Patent: Apr. 30, 2002

(54) PROCESS FOR PREPARING ANHYDRIDE-GRAFTED POLYMERS WITH IMPROVED COLOR

(75) Inventor: Chun Sing Wong, Kingston (CA)

(73) Assignee: DuPont Canada Inc., Mississauga (CA)

( * ) Notice: Subject to any disclaimer, the term of this patent is extended or adjusted under 35 U.S.C. 154(b) by 0 days.

(21) Appl. No.: 09/691,145

(22) Filed: Oct. 19, 2000

(51) Int. Cl.[7] ............................................. C08F 255/02
(52) U.S. Cl. ...................... 525/285; 525/263; 524/404; 524/405
(58) Field of Search ................ 525/285, 263; 524/404, 405

(56) References Cited

U.S. PATENT DOCUMENTS

| | | | |
|---|---|---|---|
| 3,939,183 A | 2/1976 | Gardner et al. | 260/346.8 |
| 3,975,408 A | 8/1976 | Boyer et al. | 260/346.8 |
| 4,358,600 A | 11/1982 | Kuhlmann et al. | 549/262 |
| 5,026,876 A | 6/1991 | Sugawara et al. | 549/257 |
| 5,106,916 A | 4/1992 | Mitchell et al. | 525/255 |
| 5,130,352 A * | 7/1992 | Chow | 524/405 |
| 5,344,888 A * | 9/1994 | Wild et al. | 525/285 |

FOREIGN PATENT DOCUMENTS

EP  0 266 994 A2  5/1988  ......... C08F/291/00

* cited by examiner

Primary Examiner—James J. Seidleck
Assistant Examiner—Olga Asinovsky
(74) Attorney, Agent, or Firm—Dimock Stratton Clarizio LLP; Dino P. Clarizio

(57) ABSTRACT

There is provided a process for improving the color of anhydride-grafted polymers. The process includes the steps of admixing in an extruder a polyolefin, a free radical initiator, and an anhydride-providing monomer at a temperature above the melting point of the polyolefin, adding an effective amount of an oxo-boron compound to the admixture; and extruding the resultant anhydride-grafted polymer into a shaped article.

23 Claims, No Drawings

PROCESS FOR PREPARING ANHYDRIDE-GRAFTED POLYMERS WITH IMPROVED COLOR

FIELD OF THE INVENTION

This invention relates to the field of anhydride-grafted polymers and in particular to a process for preparing anhydride-grafted polymers having improved colour using oxo-boron compounds.

BACKGROUND OF THE INVENTION

The use of polyolefins grafted with anhydrides, including maleic anhydride, as film laminates is well known in the prior art. In preparing such film laminates, it is important that a uniform product be made when grafting the anhydride onto the polymer. It is also important that the anhydride-grafted polymer have desired colour properties if it is to be used in association with colour-sensitive materials to produce products such as clear laminate films.

It is known in the prior art that the properties of polyolefins may be modified by the grafting of ethylenically unsaturated carboxylic acids and anhydrides onto hydrocarbon alpha-olefins. For example, European Patent Application No. 0 266 994 of P. C. Wong, published May 11, 1988, discloses a process for the melt grafting of an ethylenically unsaturated monomer onto a copolymer. In the process, an admixture of the copolymer, monomer, and an organic peroxide is mixed in an extruder at a temperature above the melting point of the copolymer for a period of time that is at least four times the half-life of the organic peroxide. The preferred monomers are maleic acid and maleic anhydride.

When polyolefins are treated with maleic anhydride to make a maleic anhydride grafted polymer, the colour of the resulting polymer tends to be yellow. For unknown reasons, some polyolefins form end-products that are a darker yellow than others. These dark yellow maleic anhydride-grafted polymers have proven to be commercially undesirable.

Several attempts have been made in the prior art to try to improve the colour stability of maleic anhydride.

For example, U.S. Pat. No. 3,939,183 to Gardner, entitled "Purification of Maleic Anhydride", discloses a process for obtaining purified maleic anhydrides of desired colour stability by combining and contacting a metal halide and $P_2O_5$ or a perborate with the crude maleic anhydride before final distillation of the crude maleic anhydride. Gardner does not, however, disclose using this process or suggesting another process for obtaining a maleic anhydride-grafted polymer with improved colour.

U.S. Pat. No. 3,975,408 to Boyer, entitled "Color Stabilization of Refined Dicarboxylic Acid Anhydrides" describes a process for retarding discolouration of maleic anhydride using treating agents such as halides, the transition elements, vanadium, chromium, manganese, mercury, silicon, phosphorus, bismuth, antimony, lead, cerium, and sulfur. Boyer does not, however, disclose a process for retarding discoloration of maleic anhydride-grafted polymers.

U.S. Pat. No. 4,358,600 to Kuhlmann, entitled, "Process for the Manufacture of Maleic Anhydride Having Improved Age Molten Colour" similarly provides a process for improving the colour of maleic anhydride, but not the colour of a maleic anhydride-grafted polymer. This process includes polymerizing crude maleic anhydride in the presence of metal chloride catalyst prior to fractionating the crude maleic anhydride and distilling off the purified maleic anhydride.

U.S. Pat. No. 5,026,876 to Sugawara et al, entitled, "Process for Producing Maleic Anhydride", describes a process for producing maleic anydride with colour stability by adding n-propyl gallate, cuprous chloride, and zinc chloride or tridecyl phosphite to distilled maleic anhydride.

All of these prior art patents are directed to improving the colour of maleic anhydride. None of these patents discuss or suggest a process for improving the colour of a maleic anhydride-grafted polymer.

U.S. Pat. No. 5,106,916 to Mitchell, entitled "Process for the Preparation of Grafted Polymers of Improved Colour", attempts to improve the colour of maleic anhydride-grafted polymers by providing a process for grafting maleic anhydride onto polar polymers in the presence of a phosphorus containing compound. The colour improvement of Mitchell's process is, however, limited to grafted polar polymers, it does not address the need to improve the colour of grafted non-polar polymers.

Thus, there still remains a need to provide a process for improving the colour of maleic anhydride-grafted non-polar polymers.

SUMMARY OF THE INVENTION

It is an object of one aspect of the present invention to provide a process for making a colour improved anhydride-grafted polymer.

According to one aspect of the present invention, there is provided a process for preparing an anhydride grafted polymer with improved colour comprising the steps of:
  (a) admixing in an extruder a polyolefin, a free radical initiator, and an anhydride-providing monomer at a temperature above the melting point of the polyolefin;
  (b) adding an effective amount of an oxo-boron compound to the admixture; and
  (c) extruding the resultant anhydride grafted polymer into a shaped article.

Preferably, the oxo-boron compound is boric acid and the anhydride-providing monomer is maleic anhydride.

In a further aspect of the invention, a free-radical initiator is not added to the admixture. Accordingly, in this aspect of the invention, there is provided a process for preparing an anhydride-grafted polymer with improved colour comprising the steps of:
  (a) admixing in an extruder a polyolefin and an anhydride-providing monomer at a temperature above the melting point of the polyolefin;
  (b) adding an effective amount of an oxo-boron compound to the admixture; and
  (c) extruding the resultant anhydride grafted polymer into a shaped article.

DETAILED DESCRIPTION OF THE PREFERRED EMBODIMENTS

The present invention will be described with reference to its preferred embodiments.

The present invention provides a process for obtaining an anhydride grafted polymer that has improved colour by introducing an oxo-boron containing compound into the grafting process.

The anhydride-grafted polymers may be used by themselves or blended with other polymers. They may be extruded into film or moulded into articles by using process well known in the art, such as blow moulding, rotational moulding or injection moulding.

Suitable polyolefins for use in the present invention include homopolymers and copolymers of unsaturated hydrocarbons having 2–20 carbon atoms. They can be made by processes well known in the art, including polymerization processes in which metallocene catalysts are used (single site catalysts). In particular, the polymers are homopolymers of ethylene or propylene or copolymers of ethylene with one or more alpha-olefin hydrocarbons having 3–10 carbon atoms, especially propylene, butene-1, hexene-1 and octene-1 and styrene. Suitable alpha-olefins also include dienes, that is, monomers with more than 1 site of unsaturation, especially 1,3 butadiene, 1,5 hexadiene, 5-ethylidene-2-norbornene and norbornadiene. In particularly preferred embodiments, the polyolefins are copolymers of ethylene with a hydrocarbon alpha-olefin having from 4–8 carbon atoms and having a density in the range of about 0.850 to about 0.970 grams per cubic centimetre (g/cm$^3$) and especially in the range of 0.860 to 0.930 g/cm$^3$. Preferably, the polymers have a melt index (MI) in the range of 0.05 to 120 g/10 min, especially 0.1 to 75 g/10 min and in particular 1 to 10 g/10 min (as measured per ASTM D-1238).

Other suitable polymers that may be used in the process of the present invention may be ethylene/alpha olefin copolymers such as copolymers of ethylene and a vinyl alkanoate, especially ethylene/vinyl acetate copolymers. The copolymers may have a relatively high ethylene content, and tend to be non-tacky copolymers, or lower ethylene contents, and tend to be relatively tacky copolymers. The latter include copolymers that in pellet form tend to agglomerate. In addition, the copolymers are available in a variety of molecular weights, which is usually expressed in terms of melt index. The nature of the copolymer, especially with respect to ethylene content and molecular weight, that is subjected to the process of the present invention will depend in particular on the intended end-use of the grafted copolymer that is obtained from the process. Copolymers having a wide variety of properties may be subjected to the process described herein.

The grafting monomer is selected from the group consisting of ethylenically unsaturated carboxylic acids and ethylenically unsaturated carboxylic acid anhydrides, including derivatives of such acids, and mixtures thereof. Examples of the acids and anhydrides, which may be mono-, di- or polycarboxylic acids, are acrylic acid, methacrylic acid, maleic acid, fumaric acid, itaconic acid, crotonic acid, itaconic anhydride, maleic anhydride and substituted maleic anhydride e.g. dimethyl maleic anhydride or citraconic anhydride, nadic anhydride, nadic methyl anhydride and tetrahydro phthalic anhydride.

The amount of grafting monomer necessary in the process of the present invention will depend in particular on the reactivity of the monomer. For example, if the monomer is maleic anhydride, the amount of monomer may be as high as about 5%, especially 0.1–3%, by weight of the copolymer, and particularly in the range of 0.5–2% by weight. With other grafting monomers, different amounts of monomer may be preferred.

In a preferred embodiment, the process involves grafting maleic anhydride onto a suitable polymer and adding an oxo-boron compound to the reaction mixture early during the process, and preferrably together with the feed polymers. The oxo-boron compound should preferably not be added after the maleic anhydride.

The oxo-boron compound can be introduced into the reaction mixture in various forms. It can be added as a solution, as a melt-blended masterbatch, or as a dry-blend masterbatch. It will be apparent to one skilled in the art that the oxo-boron compound can be added together with the polymer at the front of the extruder or it can be dissolved in the maleic anhydride and added together. The decision to prepare or not prepare a master batch depends on the limitations imposed by the equipment used.

The addition of a suitable amount of a oxo-boron compound during the grafting process has been found to unexpectedly improve the colour of the resulting anhydride-grafted polymer. Examples of oxo-boron compounds that are useful include boric acid, boron oxide and zinc borate. It will be apparent to those skilled in the art that other oxo-boron compounds may also be used in the context of the present invention. Boric acid is a preferred compound.

The amount of oxo-boron compound required to provide colour improvement also depends on the polymer used and the amount of grafting monomers added during the grafting process. It has been found that the addition of even a small amount of oxo-boron compound in the feed greatly improves the colour quality.

In a preferred embodiment a mole ratio of anhydride monomer to oxo-boron compound in the range of 30:1 to 500:1 is preferred. In the most preferred embodiment, the mole ratio in the range of 60:1 to 300:1 is used. The same mole ratio ranges also apply if boric acid is used.

It will be apparent to a person skilled in the art that the rate of the grafting process can be enhanced by adding a free-radical initiator such as a peroxide to the admixture. The peroxide used should have a suitable decomposition temperature. If it decomposes too rapidly under the processing conditions, it will lose its effectiveness. On the other hand, if it decomposes too slowly, the reaction will be too slow resulting in low levels of grafting and possibly an unstable product. The amount of peroxide used depends on the base polymer. When the base polymer is polyethylene (PE), a low level peroxide is generally used in the range of 50 ppm to 300 ppm. With polypropylene (PP), the amount of peroxide added is generally at least 1000 ppm. For best results, the peroxide is evenly dispersed within the polymer during the reaction process.

The anhydride-grafted polymers made from the process of the present invention may be used to manufacture shaped articles. The shaped articles will usually be films, pellets or other comminuted shapes, but are not restricted thereto. The anhydride-grafted polymers may be used as such or as blends with other polymers, especially in the form of adhesive compositions for use with polymers and/or metals, in co-extrusion of multiple layer structures, in coating compositions, as compatibilizers in polymer blends to improve the physical properties of the blend and as coupling agents in field compositions.

The colour improvement of the resulting anhydride-grafted polymer can best be monitored by measuring the yellowness index (YI) of the grafted polymer. YI is a number computed by a standard procedure from colorimetric data that indicates a departure of an object of colour from a preferred white, towards yellow. An object with a high YI would be yellower than one with a lower YI. The human eye can distinguish two samples that have a YI difference of 5 units when they are placed side by side.

EXAMPLES

As shown in Example 1, the addition of 60 ppm of boric acid at a mole ratio of 127:1 maleic anhydride:boric acid during the grafting reaction results in a 2–3 fold decrease in the yellowness index of the resulting anhydride-grafted polyethylene. As shown in Examples 2 and 3, the yellowness index of the maleic anhydride-grafted polymer continuously decreases with increasing additions of boric acid. The optimal ratio of maleic anhydride to boric acid differs depending on the characteristic of the polymer. In general, the addition of a certain amount of boric acid will decrease the yellowness index of the grafted polymer. With increasing amounts of maleic anhydride, a lower ratio of maleic anyhdride to boric acid is required.

With respect to polypropylene, Example 3 shows that the yellowness index of the resulting anhydride-grafted polypropylene is within acceptable values for mole ratios in the preferred range of 60:1 to 130:1.

In a preferred embodiment, boric acid is used. However, a decrease in the yellowness index can also be achieved by the addition of zinc borate or boron oxide (Example 4).

Example 1

The compositions of Example 1 were preblended together as feed for the grafting process and then grafted with 1.2% maleic anhydride in a 38:1 L/D, 43 mm Berstroff twin screw extruder at a temperature of 270° C.

For further clarification, the boric acid masterbatch provided in Example 1 comprises boric acid concentrate, prepared by using 1 g of boric acid in 1 kg of PE1 pellets by dry blending.

PE1 is an ethylene/octane/butene terpolymer with a density of 0.910 g/cc. The melt index (MI) was 1.9 g/10 min. Feed compositions were prepared using either a dry blend of 0.6 kg peroxide concentrate (PE1 containing 7500 ppm 2,5-dimethly-2,5-bi(p-butylperoxy)hexane) and 19.4 kg of PE1, or a dry blend of 0.6 kg of peroxide concentrate, 1.2 kg of boric acid master batch, and 18.2 kg of PE1.

The plastomer used was a very low density ethylene octene copolymer. It had a density of 0.863 g/cc and an MI of 0.5 g/10 min. Feed compositions were prepared using either a dry blend 0.8 kg of peroxide concentrate and 19.2 kg of plastomer, or a dry blend 0.8 kg of, 1.2 kg of boric acid master batch and 18 kg of plastomer.

The yellowness index was measured on pellet samples using a Hunterlab Colourimeter equipped with a D-25M optico sensor in a DP-9000 processor.

| Sample No. | PE1 | Plastomer | Boric Acid Masterbatch | Peroxide % | Grafted Maleic Anhydride % | Melt Index (MI) | Yellowness Index (YI) | Mole Ratio Maleic Anhydride /Boric Acid |
|---|---|---|---|---|---|---|---|---|
| A | 97% | 0 | 0 | 3% | 1.04% | 1.0 | 20–24 | |
| B | 91% | 0 | 6% (60 ppm B(OH)$_3$) | 3% | 1.10% | 1.5 | 12–14 | 127/1 |
| C | 0 | 96% | 0 | 4% | 0.78% | 1.5 | 36–44 | |
| D | 0 | 90% | 6% (60 ppm B(OH)$_3$) | 4% | 0.94% | 1.3 | 12–22 | 127/1 |

Example 2

In this example, EPDM (ethylene/propene/diene terpolymer) was the base polymer. The EPDM used had a density of 0.87 g/cc and a Mooney viscosity of 45. 300 ppm of peroxide was added using PE1 peroxide concentrate. The reaction temperature was 280° C.

| Sample No. | Maleic Anhydride Added | Boric Acid Concentrate | Maleic Anhydride:Boric Acid Mole Ratio (Ma:Ba) | Grafted Maleic Anhydride % | Yellowness Index (YI) |
|---|---|---|---|---|---|
| A | 2% | 0 | | 2% | 53–63 |
| B | 1.8% | 1.9%(94 ppm) | 121:1 | 1.8% | 43–49 |
| C | 1.8% | 3.7%(188 ppm) | 61:1 | 1.7% | 30–43 |

Example 3

In this example, polypropylene (PP) copolymer, which is comprised of 4% ethylene and has a MFI (melt flow index) of 5 g/10 min. (230° C.), was used. PP was fed through a 12-barrel 48/1 L/D co-rotating twin screw extruder. Polypropylene peroxide concentrate (0.95% 2,5-dimethyl-2,5-di(t-butylperoxy)hexane in polypropylene) was then added both at the feed throat and at the barrel of the extruder at a ratio of 60:40 with more peroxide at the throat. The total peroxide concentration in the reaction mixture was 5700 ppm.

2% molten maleic anhydride was injected into the extruder at the second barrel. After which, boric acid, if required, was added at the throat as a dry blend with the polypropylene. The temperature of the reaction zone was 230° C.

| Sample No. | Boric Acid Concentration | Maleic Anhydride/Additive Mole Ratio | Yellowness Index (YI) | Grafted Maleic Anhydride % | Melt Flow Index (MFI) |
|---|---|---|---|---|---|
| A | 0 ppm | — | 50 | 1.3% | 475 |
| B | 100 ppm | 127/1 | 41 | 1.25% | 441 |
| C | 150 ppm | 84/1 | 32 | 1.14% | 433 |
| D | 200 ppm | 63/1 | 36 | 1.28% | 555 |

Example 4

In this example, the grafting process was carried out in a 43 mm, 38/1 L/D Berstorff twin screw co-rotating extruder. PE2 (ethylene/butene copolymer, density=0.920 g/cc, MI=5.0 g/10 min), 4% of the peroxide concentrate (0.75% peroxide, 2,5-dimethyl-2,5-di(t-butylperoxy)hexane in PE1) and a prescribed concentration of an additive (either boric acid, zinc borate, or boron oxide) were then dried blended (as indicated) and used as the feed.

1.5% of molten maleic anhydride was added into the process by injection.

The throughput of the process was 15 kg/hr and the screw speed was 200 rpm. The reaction zone temperature was set at 280° C.

| Sample No. | Additive, PPM | Mole Ratio Of Maleic Anhydride/Additive | Yellowness Index (YI) | Grafted Maleic Anhydride % | Melt Index (MI) |
|---|---|---|---|---|---|
| A | None | — | 31.5–35.8 | 1.10% | 0.51 |
| B | Boric Acid, 50 | 190/1 | 21.8–23.4 | 1.10% | 0.52 |
| C | Zinc Borate, 300 | 195/1 | 22.2–22.3 | 1.13% | 0.47 |
| D | Boron Oxide, 50 | 181/1 | 23.5–24.8 | 1.04% | 0.60 |

Although the present invention has been shown and described with respect to its preferred embodiments, it will be understood by those skilled in the art that other changes, modifications, additions and omissions may be made without departing from the substance and the scope of the present invention as defined by the attached claims.

What is claimed is:

1. A process for preparing an anhydride grafted polymer with improved colour properties, consisting essentially of the steps of:
   (a) admixing in an extruder a polyolefin and a anhydride-providing monomer at a temperature above the melting point of the polyolefin;
   (b) adding an effective amount of a oxo-boron compound to the admixture; and
   (c) extruding the resultant anhydride grafted polymer into a shaped article.

2. The process of claim 1 wherein the anhydride-providing monomer is maleic anhydride.

3. The process of claim 1 wherein the olefin in the polyolefin is an alpha-olefin.

4. The process of claim 1 wherein the oxo-boron compound is added at a mole ratio in the range of 1:30–1:500 oxo-boron compound:anhydride-providing monomer.

5. The process of claim 1 wherein the oxo-boron compound is selected from the group consisting of boric acid, boron oxide and a borate.

6. The process of claim 5 wherein the oxo-boron compound is boric acid.

7. The process of claim 6 wherein boric acid is added at a mole ratio in the range of 1:30–1:500 boric acid:anhydride-providing monomer.

8. The process of claim 6 wherein boric acid is added at a mole ratio in the range of 1:60–1:300 boric acid:anhydride-providing monomer.

9. A process for preparing an anhydride-grafted polymer with improved colour properties, consisting essentially of the steps of:
   (a) admixing in an extruder a polyolefin, a free radical initiator, and an anhydride-providing monomer at a temperature above the melting point of the polyolefin;
   (b) adding an effective amount of a oxo-boron compound to the admixture; and
   (c) extruding the resultant anhydride-grafted polymer into a shaped article.

10. The process of claim 9 wherein the anhydride-providing monomer is maleic anhydride.

11. The process of claim 9 wherein the free-radical initiator is peroxide.

12. The process of claim 9 wherein the olefin in the polyolefin is an alpha-olefin.

13. The process of claim 9 wherein the oxo-boron compound is added at a mole ratio in the range of 1:30–1:500 oxo-boron compound:anhydride-providing monomer.

14. The process of claim 9 wherein the oxo-boron compound is selected from the group consisting of boric acid, boron oxide and a borate.

15. The process of claim 14 wherein the oxo-boron compound is boric acid.

16. The process of claim 15 wherein boric acid is added at a mole ratio in the range of 1:30–1:500 boric acid:anhydride-providing monomer.

17. The process of claim 15 wherein boric acid is added at a mole ratio in the range of 1:60–1:300boric acid:anhydride-providing monomer.

18. The process of claim 2 wherein the amount of maleic anhydride is 5% by weight.

19. The process of claim 2 wherein the amount of maleic anhydride is 0.1 to 3% by weight.

20. The process of claim 2 wherein the amount of maleic anhydride is 0.5 to 2% by weight.

21. The process of claim 10 wherein the amount of maleic anhydride is 5% by weight.

22. The process of claim 10 wherein the amount of maleic anhydride is 0.1 to 3% by weight.

23. The process of claim 10 wherein the amount of maleic anhydride is 0.5 to 2% by weight.

* * * * *